United States Patent [19]
Reardon

[11] 3,716,298
[45] Feb. 13, 1973

[54] PHOTOGRAPHIC ENLARGER

[76] Inventor: Edward A. Reardon, 5183 Bohlig Rd., Los Angeles, Calif. 90032

[22] Filed: July 14, 1970

[21] Appl. No.: 54,709

[52] U.S. Cl. ...................355/71, 240/1.3, 240/9.5, 240/41.35, 240/51.12, 355/70
[51] Int. Cl. ...............................................G03b 27/76
[58] Field of Search..........355/70, 71, 67, 68, 69, 37; 240/1.3, 9.5, 20, 41.35, 51.12

[56] References Cited

UNITED STATES PATENTS

| | | | |
|---|---|---|---|
| 2,415,635 | 2/1947 | Hopkins | 240/1.3 X |
| 2,923,812 | 2/1960 | Hauptvogel | 240/51.12 X |
| 2,895,378 | 7/1959 | Budde | 355/69 |
| 3,028,483 | 4/1962 | Simmon | 240/41.35 |
| 2,263,684 | 11/1941 | Ryan | 240/9.5 |
| 3,010,362 | 11/1961 | Smith | 250/201 |

*Primary Examiner*—Samuel S. Matthews
*Assistant Examiner*—Richard L. Moses
*Attorney*—Lavine, Cantor & Reich

[57] ABSTRACT

A photographic enlarger having an electronic discharge flash tube as the light source for making the exposure, there is additionally provided an auxiliary light source for permitting focusing. Color value filters and light attenuating elements in the form of polarizing material discs are also provided.

13 Claims, 3 Drawing Figures

PATENTED FEB 13 1973 3,716,298

INVENTOR
EDWARD A. REARDON

BY Savine, Cantor & Reich
ATTORNEYS

PHOTOGRAPHIC ENLARGER

BACKGROUND OF THE INVENTION

The present invention is directed to photographic enlargement apparatus for making an enlargement from a photographic negative.

Photographic enlargers are known which provide generally a lamp housing having a lamp or light source therein, a light directing reflector, and a holder for the photographic negative which is being enlarged. The light source or lamps used in the known photographic enlarging apparatus has been either incandescent lamps, or fluorescent lamps, or in some cases, both of these types has been provided. Such enlargers have the deficiencies, however, of generating heat and requiring a relatively long exposure time. The heat generated from the light source often causes the negative to buckle, which results in a loss of focus, and consequently in an inferior enlargement. In addition, the heat from the light source results in deterioration of the negative, and consequent shortening of the life thereof. Also relatively long exposure times have been required, and in order to avoid vibration of the enlarger during this relatively long exposure time, it has been the practice in the art to make the enlarger and its related supports of relatively heavy parts, to thereby avoid the vibration problem. This has, of course, unnecessarily increased the manufacturing costs of the enlarger.

In addition to the above noted deficiencies, it has been found that that the supply current has fluctuated, on occasion, during the exposure period, thereby resulting in inconsistencies in the enlargements produced, due to resulting variations in light intensity from the incandescent or fluorescent lamp. Further, the lenses provided as part of the enlarger have associated with them a diaphragm to control the light intensity which reaches the negative, but in practice, utilization of the diaphragm has necessitated operation of the enlarger at lens openings which are other than optimum, again providing inferior results.

Among the objects of the present invention are to provide a photographic enlarger in which improper focusing due to buckling of a negative from the heat of the light source is eliminated. A further object of the present invention is to provide a photographic enlarger which will not have a deleterious effect on negatives used therein. Still another object of the present invention is the provision of a photographic enlarger having consistent light intensity for each exposure. Yet another object of the present invention is to provide a photographic enlarger in which the lenses may be used with optimum lens opening. A still further object of the present invention is to provide a photographic enlarger which may be built of comparatively light weight components, thereby effecting a cost reduction. Another object of the present invention is to provide a photographic enlarger permitting a very brief exposure time during the enlargement.

Other objects of the present invention will become apparent upon consideration of the additional disclosure herein.

SUMMARY OF THE INVENTION

A photographic enlarger is provided having as its principal light source an electronic flash tube. A parabolic reflector is provided for the electronic flash tube, over the open end of which is an optical filter which permits passage only of light having a color value approximating that of a fluorescent tube. There is also provided a fluorescent tube, and a second filter permitting passage only of light which is of substantially the same color value as that emitted by incandescent lamps. In addition to a diffuser and condenser lenses, there is also provided a light attenuating means which preferably is in the form of a pair of discs made of polarizing material, one disc being rotatably mounted in its plane, to thereby permit variation in the amount of light passing through the two discs. Each of the tubes is under the control of a separate switch.

DESCRIPTION OF THE PREFERRED EMBODIMENT

Figure 1:
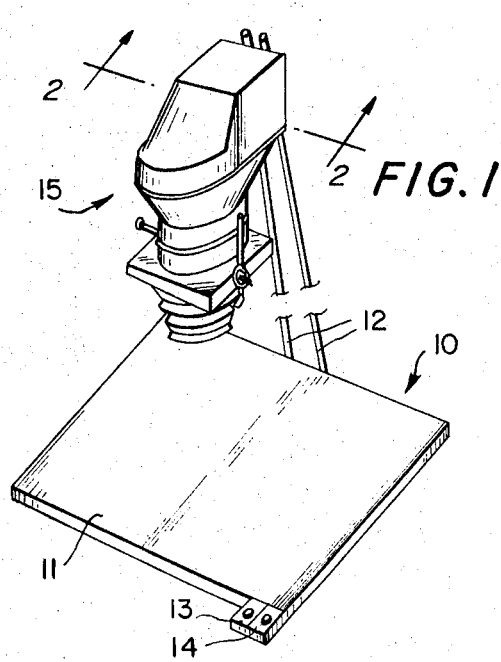
FIG. 1 is a perspective view, with parts broken away, of an enlarger in accordance with the present invention.

Referring now to the drawings, wherein like or corresponding reference numerals are used to designate like or corresponding parts throughout the several views, there is shown in FIG. 1 an enlarger generally designated 10 and comprising a baseboard or platform 11 having extending upwardly therefrom supporting tracks 12 which are parallel to each other and which are cantilevered forwardly so that the upper ends thereof generally lie over the baseboard 11. The tracks 12 support an enlarger head 15, and in known fashion enlarger head 15 may be secured in various selected positions on the racks 12. At a suitable location, such as adjacent baseboard 11, there are provided switches 13 and 14, connected to light generating tubes to be hereinafter described.

Figure 2:
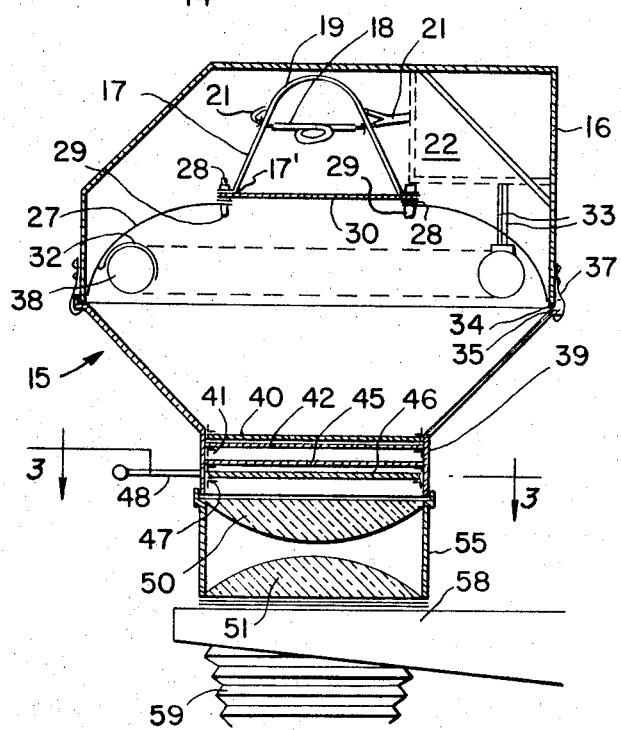
FIG. 2 is a cross-sectional view taken on line 2—2 of FIG. 1.

Referring now to FIG. 2, the enlarger head 15 may be seen to include a housing 16, in the upper part of which there is fastened a parabolic reflector 17 having an open end 17', reflector 17 being directed vertically downwardly, and centered on an optical axis of the enlarger head 15. This optical axis generally coincides with the central axis of the enlarger head 15. Positioned within the parabolic reflector 17 is an electronic discharge tube 18, tube 18 being supported by its leads 19 substantially at the focal point of parabolic reflector 17. Leads 19 are connected with conductors 21 which extend to a power supply 22 of known construction, but generally including a condensor which, in combination with other known circuitry, provides an extremely short discharge time of electronic discharge tube 18, when energized. For example, the discharge time may be approximately 1/1000th of a second. The power supply 22 is connected with a suitable power source through switch 13.

Also mounted in the housing 16 is a mushroom-shaped reflector 27 which is directed generally downwardly, and is centered on the optical axis of the enlarger head 15. Reflector 27 has in the upper portion thereof a central opening 28, the parabolic reflector 17 being mounted above the mushroom-shaped reflector 27, with tube 18 adjacent the opening 28. Secured across the open end of parabolic reflector 17, as by nut and bolt fasteners 29 which engage a flange on the reflector 17, is an optical filter 30. Filter 30 permits passage therethrough from the electronic discharge flash tube 18 only light having a color value, i.e., a color temperature, which matches the color value of a fluorescent tube, specifically the circular fluorescent tube 38 which is secured to the reflector 27 by suitable clips 32. Conductors 33 are connected to the fluorescent tube 38, and extend to the power supply 22, which contains the normal ballast, starter and other parts of conventional circuitry for supplying current to a fluorescent tube. The fluorescent tube supply circuit is connected with a current source through the switch 14.

Preferably, housing 16 is of relatively light weight metal, or material such as fiberglass or plastic, and is provided with an access hole, not shown, for permitting access to a power supply 22 for repair or replacement thereof. Housing 16 terminates at an open end 34, which rests on a ledge 35 of lower housing 36, which latter is secured in position by means of spring clips 37. Below the ledge 35, housing 36 may be seen to taper towards the optical axis, terminating in a cylindrical portion 39.

Secured in the upper part of cylindrical portion 39 is a filter 40 which will receive light from both the electronic discharge tube 18 and the fluorescent tube 38 and pass light having a color value substantially the same as that of incandescent lamp(s).

Figure 3:
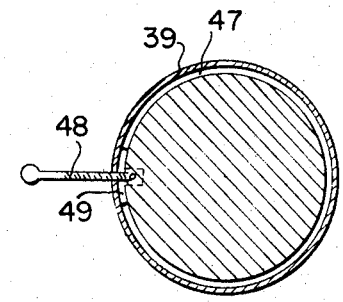
FIG. 3 is a cross-sectional view taken on line 3—3 of FIG. 2.

Also mounted in the cylindrical portion 39, below the filter 40 is a diffuser 42, and below diffuser 42 there are mounted a pair of discs 45 and 46 of polarizing material, disc 45 being fixed and disc 46 being rotatable in its plane. Polarizing material disc 46 is supported on an annular ledge 47 (see also FIG. 3), and has extending therefrom a handle 48. Handle 48 extends through an arcuate slot 49 in the cylindrical portion 39, to permit movement thereof. An indicator scale (not shown) may be provided on cylindrical portion 39 for cooperation with handle 48, to indicate the setting of disc 47. Disc 47 is oriented relative to disc 45 so that an intermediate amount of light may pass therethrough in an intermediate position of handle 48. Thereby movement of handle 48 in one direction will effect the passage of more light. Hence, this structure including the fixed disc 45 and the movable disc 46 provide an adjustable light attenuating means.

Secured to the end of the cylindrical portion 39 is a condenser lens system including an upper condenser lens 50 and a lower condenser lens 51, carried in a housing 55. Beneath the housing 55 is a negative holder 58, which receives, in conventional manner, a negative to be enlarged. Extending beneath and connected to the lens carrier 58 is a bellows 59, which may be provided at the lower end thereof with a conventional lens board for supporting a lens, these portions not being shown in the drawing for purposes of clarity.

In operation, a negative to be enlarged is placed in the negative holder 58, and switch 14 is actuated in order to provide energization of the fluorescent tube 38. Light from tube 38 is reflected downwardly generally parallel to the optical axis by the reflector 27, passing through the filter 40, admitting light value as above noted. Focusing in normal manner is then accomplished, and switch 14 is again actuated to turn off the fluorescent tube 38. Thereupon, photographic paper upon which the print is to be made is placed upon the baseboard 11 in conventional manner and the enlarger lens is set to its optimum opening. Also, the light attenuating means is adjusted, if necessary, by movement of handle 48. The switch 13 is then depressed, thereby actuating or energizing the electronic discharge tube 18, which provides, as above noted, a light flash of approximately 1/1000th second duration, the light being parallel to the optical axis since tube 18 is at the focal point of reflector 17.

In connection with the enlargement of some negatives, dodging or burning-in of the image may be required; and this is accomplished by making the exposure with the fluorescent tube 38 as the light source, rather than the electronic discharge tube 18. For an electronic flash discharge tube 18 having a color temperature close to that of an incandescent lamp, the filter 30 is not required, if an incandescent lamp or lamps is used, the filter 40 is not required.

The enlarger of the present invention has a pair of light sources in the form of an electronic discharge tube and a fluorescent tube, both of which provide little heat, thereby avoiding warpage or buckling of the negative and deterioration thereof. The enlarger of the present invention, since it utilizes primarily an electronic flash tube having a light flash of very limited duration, will not be effected unduly by vibrations, and therefore the present invention enlarger can be of relatively light weight construction, and therefore more economical. Fluctuation in line voltage will not effect the operation of the present enlarger, whichever of the light sources is utilized.

It will be obvious to those skilled in the art that various changes may be made without departing from the spirit of the invention and therefore the invention is not limited to what is shown in the drawings and described in the specification but only as indicated in the appended claims.

I claim:

1. A photographic enlarger comprising:
   a housing,
   light generating means in said housing including electronic flash tube means for generating a light flash of a duration of a fraction of a second and means for generating light and having lower heat emission than an incandescent lamp comprising a fluorescent tube,
   means for directing light from each said tube generally along said optical axis,
   negative holding means positioned to receive light generated by said light generating means,
   variable light attenuating means on said optical axis between said light generating means and said negative holding means, and filter means for transmitting light having color-temperature substantially the same as that of an incandescent lamp to a negative in said negative holding means.

2. The enlarger of claim 1, and means for selectively energizing each said light generating means.

3. The enlarger of claim 1, said filter means comprising a filter positioned to intercept light only from said electronic flash tube for transmitting only light having substantially the same color value as a fluorescent tube.

4. The enlarger of claim 3, said filter means further comprising a filter positioned to receive light from both said electronic flash tube and said fluorescent tube.

5. The enlarger of claim 1, wherein said electronic flash tube is more remote from said negative holding means than said second light generating means.

6. The enlarger of claim 5, said light directing means comprising a parabolic reflector, said electronic flash tube positioned substantially at the focal point thereof.

7. The enlarger of claim 1, said fluorescent tube being annular and said light directing means comprising a reflector for each said tube.

8. The enlarger of claim 7, said reflector for said fluorescent tube being generally mushroom shape and having a central opening.

9. The enlarger of claim 8, said reflector for said flash tube being a parabolic reflector with its open end at said central opening of said mushroom shaped reflector, said flash tube being substantially at the focal point of said parabolic reflector.

10. The enlarger of claim 1, said light attenuating means comprising a pair of planar elements of polarizing material disposed generally perpendicularly to said optical axis, and means for rotating one said element in its plane.

11. The enlarger of claim 10, said one element being a disc, and means for rotating said disc.

12. The enlarger of claim 1, and light focusing means on said optical axis between said light generating means and said negative holding means.

13. The enlarger of claim 12, and light diffusing means between said light generating means and said light attenuating means.

* * * * *